(12) United States Patent
Wilt (10) Patent No.: US 8,151,095 B1
(45) Date of Patent: Apr. 3, 2012

(54) SYSTEM AND METHOD FOR CONTEXT MIGRATION ACROSS CPU THREADS

(75) Inventor: Nicholas Patrick Wilt, Rochester, NY (US)

(73) Assignee: NVIDIA Corporation, Santa Clara, CA (US)

( * ) Notice: Subject to any disclaimer, the term of this patent is extended or adjusted under 35 U.S.C. 154(b) by 868 days.

(21) Appl. No.: 12/176,287

(22) Filed: Jul. 18, 2008

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................... 712/228
(58) Field of Classification Search .................... None
See application file for complete search history.

(56) References Cited

U.S. PATENT DOCUMENTS

| 5,115,506 | A | * | 5/1992 | Cohen et al. | 710/267 |
| 5,515,538 | A | * | 5/1996 | Kleiman | 710/260 |
| 5,535,397 | A | * | 7/1996 | Durante et al. | 710/267 |

FOREIGN PATENT DOCUMENTS

| WO | WO 2008/127610 | 10/2008 |
| WO | WO 2008/127622 | 10/2008 |
| WO | WO 2008/127623 | 10/2008 |

OTHER PUBLICATIONS

Agarwal et al.; APRIL: A Processor Architecture for Multiprocessor; 1990; IEEE.*
Moss, et al. "Toward Acceleration of RSA Using 3D Graphics Hardware," LNCS 4887, Dec. 2007, pp. 369-388.
Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Corey S Faherty
(74) *Attorney, Agent, or Firm* — Patterson & Sheridan, LLP (57) ABSTRACT

One embodiment of the present invention sets forth a technique for associating arbitrary parallel processing unit (PPU) contexts with a given central processing unit (CPU) thread. The technique introduces two operators used to manage the PPU contexts. The first operator is a PPU context push, which causes a PPU driver to store the current PPU context of a calling thread on a PPU context stack and to associate a named PPU context with the calling thread. The second operator is a PPU context pop, which causes the PPU driver to restore the PPU context of a calling function to the PPU context at the top of the PPU context stack. By performing a PPU context push at the beginning of a function and a PPU context pop prior to returning from the function, the function may execute within a single CPU thread, but operate on a two distinct PPU contexts.

14 Claims, 7 Drawing Sheets

SYSTEM AND METHOD FOR CONTEXT MIGRATION ACROSS CPU THREADS

BACKGROUND OF THE INVENTION

1. Field of the Invention

Embodiments of the present invention relate generally to parallel processing and more specifically to a system and method for context migration across CPU threads.

2. Description of the Related Art

Typical parallel processing subsystems include at least one parallel processing unit (PPU) that may be configured to beneficially provide a high volume of computational throughput that is impractical to achieve with a single processing unit. The PPU may be configured to incorporate a plurality of processing cores, each capable of executing one or more instance of a parallel program on a plurality of processing engines. Each executing instance of the parallel program, called a PPU thread, or simply "thread," typically computes a portion of the required overall results.

In conventional application execution models, a user application may employ PPU threads to perform a portion of the computations required by the user application. A user application commonly includes one or more central processing unit (CPU) threads executing on the CPU, where each CPU thread that employs a PPU to perform computations must include an associated PPU context that is specifically coupled to the CPU thread. The PPU context may remain associated with the related CPU thread for the lifetime of the CPU thread, and may not coexist with a second PPU context associated with the same CPU thread. In other words, a one-to-one coupling is created between the CPU thread and the PPU context. This type of conventional execution model has certain benefits. One benefit is that CPU threads may efficiently refer to and access data in a related PPU context through the simple one-to-one CPU thread to PPU context association. In some well known operating systems, the PPU context may reside in thread-local storage, providing an efficient, well-understood access methodology. An additional benefit arises because only one CPU thread may access a given PPU context at a time, thereby eliminating a synchronization step and improving overall performance.

However, the conventional execution model also creates certain important inefficiencies. One important inefficiency in the conventional execution model is that an application that may benefit from incorporating multiple PPU contexts is required to incorporate and execute an additional CPU thread per additional PPU context. Each additional thread requires additional memory and execution overhead, and introduces additional programming complexity. Furthermore, under the conventional execution model, libraries that call the PPU to perform computations on behalf of user applications are required to create a "worker thread" per additional PPU context and delegate any PPU computation from the user application to the worker thread for processing. This delegation process increases application complexity. In both cases, overall performance suffers due to the additional execution overhead.

As the foregoing illustrates, what is needed in the art is a technique for efficiently managing PPU contexts within multi-threaded parallel processing systems.

SUMMARY OF THE INVENTION

One embodiment of the present invention sets forth a method for preserving a processing unit context associated with a processing unit thread. The method includes the steps of receiving from a first calling function a request to store a first processing unit context associated with the processing unit thread, storing the first processing unit context, associating a second processing unit context with the processing unit thread; and returning execution to the first calling function.

One advantage of the disclosed method is that it enables a PPU context push at the beginning of a function and a PPU context pop prior to returning from the function. Thus, the function may execute within a single CPU thread, but advantageously operate on a two distinct PPU contexts.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
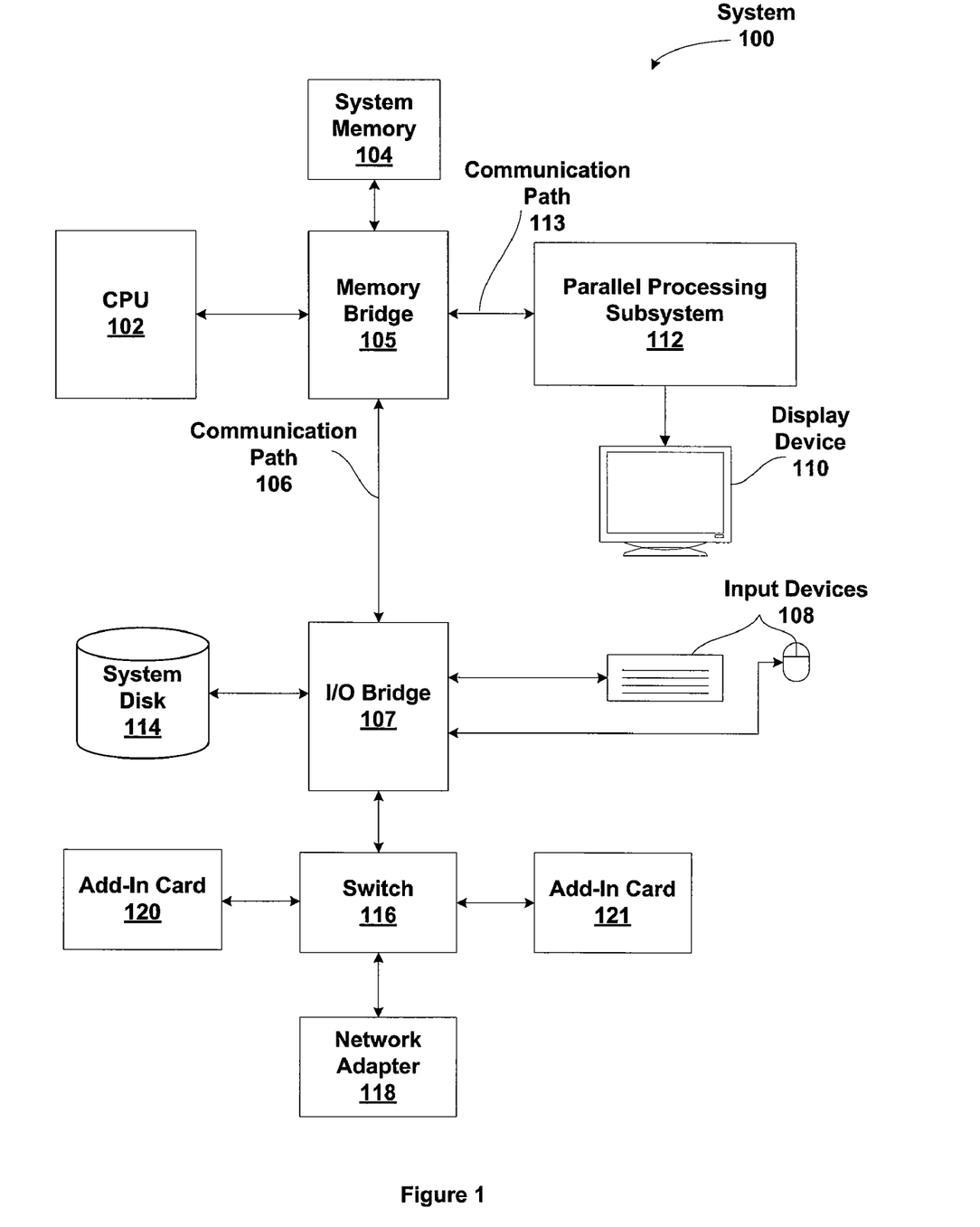
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
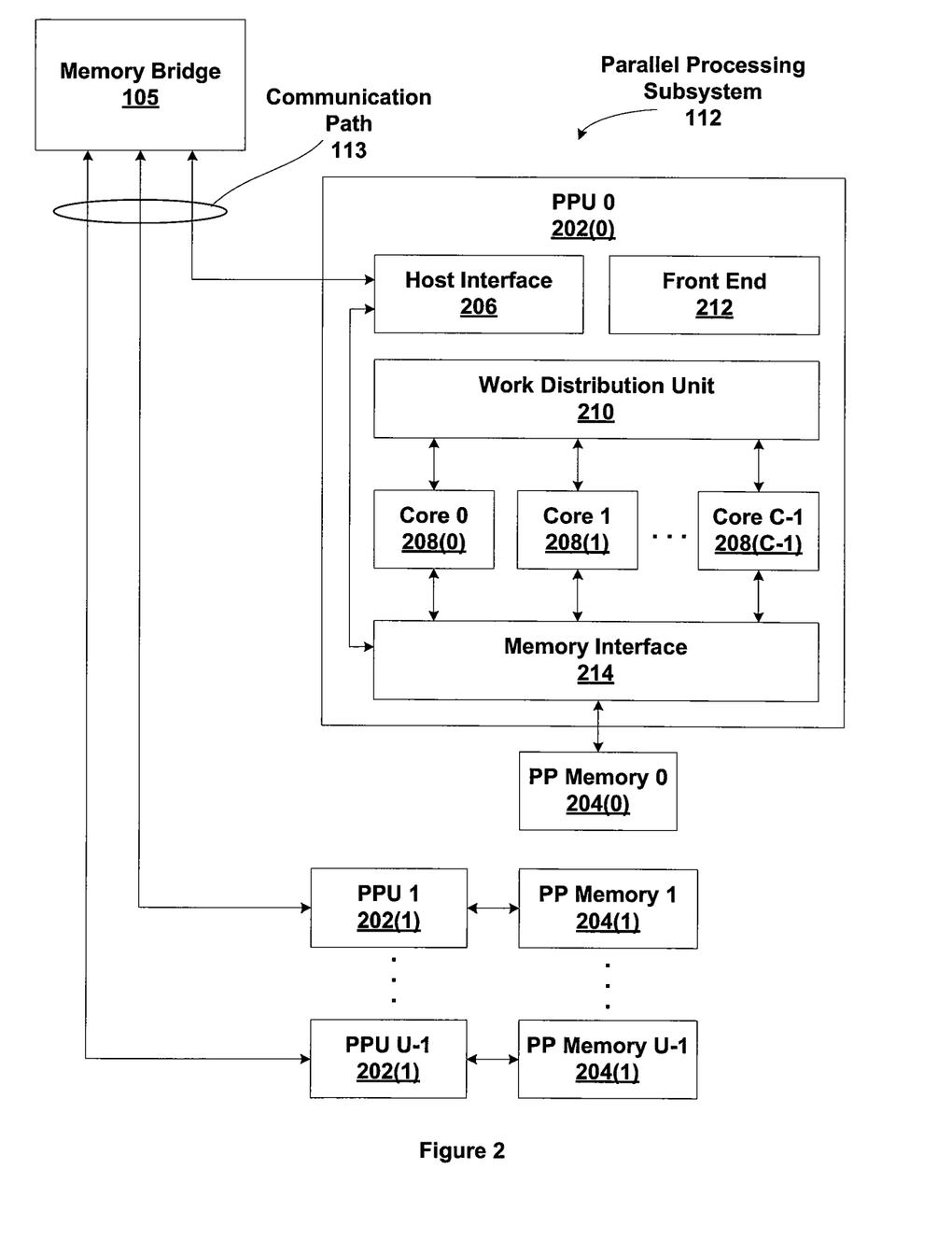
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
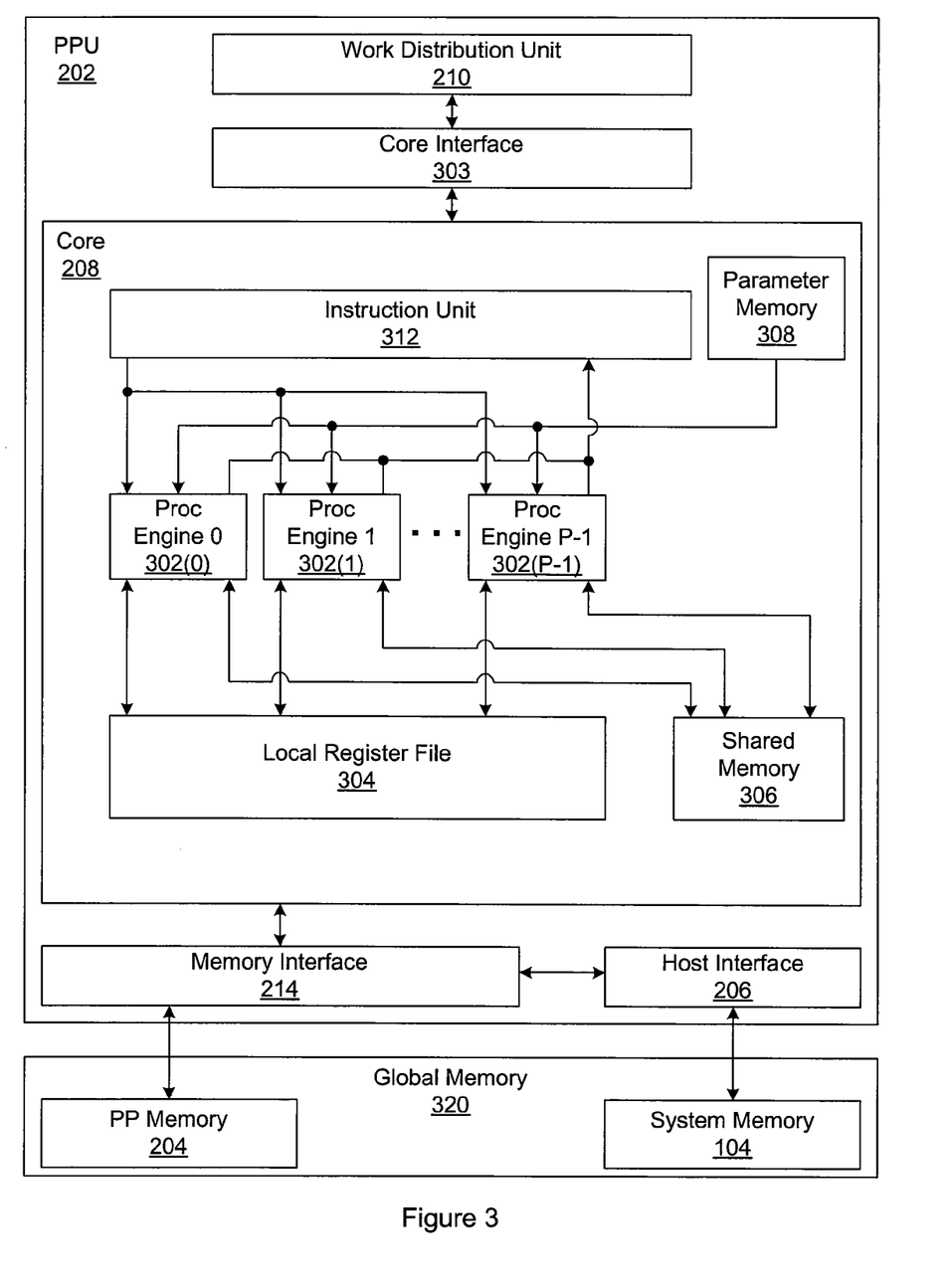
FIG. 3 is a block diagram of a parallel processing unit for the parallel processing subsystem of FIG. 2, in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "warp" or "thread group." Additionally, a plurality of related thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is typically an integer multiple of the number of parallel processing engines 302 in a core 208, and m is the number of thread groups simultaneously active on the core 208. The size of a CTA is generally determined by the programmer and the amount of hardware resources, such as memory or registers, available to the CTA.

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMT execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) may be issued to all P processing engines 302. Thus, at the level of a single clock cycle, core 208 implements a microarchitecture substantially representing a P-way SIMT or SIMD design. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 may issue the same instruction to all P processing engines 302 in parallel, core 208 is advantageously used to process threads in "SIMT thread groups." As used herein, a "SIMT thread group" or "warp" refers to a group of up to P threads of execution of the same program on different input data, with one thread of the group being assigned to each processing engine 302. A SIMT thread group may include fewer than P threads, in which case some of processing engines 302 will be idle during cycles when that SIMT thread group is being processed. A SIMT thread group may also include more than P threads, in which case processing will take place over consecutive clock cycles. Since each processing engine 302 can support up to G threads concurrently, it follows that up to G SIMT thread groups can be executing in core 208 at any given time.

On each clock cycle, one instruction is issued to all P threads making up a selected one of the G SIMT thread groups. To indicate which thread group is currently active, a warp identifier for the associated warp or thread group may be included with the instruction. Processing engine 302 uses the warp identifier as a context identifier, e.g., to determine which portion of its assigned lane in local register file 304 should be used when executing the instruction. Thus, in a given cycle, all processing engines 302 in core 208 are nominally executing the same instruction for different threads in the same SIMT thread group. In some instances, some threads in a SIMT thread group may be temporarily idle, e.g., due to conditional or predicated instructions, divergence at branches in the program, or the like.

The core 208 also includes a vote unit 330, which is configured to receive and execute instructions from the instruction unit 312 to compute vote results. The vote unit 330 computes a given vote result by processing data residing in certain registers within the local register file 304 that may be specified by an associated instruction. The vote unit 330 stores a given vote result in a plurality of registers within the local register file 304 such that related threads executing processing engines 302 may access to the vote result.

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMT thread group in instruction unit 312, then signals instruction unit 312 to begin executing the threads. When execution of a thread or SIMT thread group is completed, core 208 advantageously notifies core interface 303. Core interface 303 can then initiate other processes, e.g., to retrieve output data from shared memory 306 and/or to prepare core 208 for execution of additional threads or SIMT thread groups.

It will be appreciated that the core architecture described in FIGS. 1, 2 and 3 is illustrative and that variations and modifications of this architecture fall within the scope of the present invention. For example, any number of processing engines may be included in each core 208. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Thread Arrays and Cooperative Thread Arrays

In some embodiments, multithreaded processing core 208 of FIG. 3 can execute general-purpose computations using thread blocks or thread arrays. A thread array consists of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set or produces one portion of the output data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput. In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

In some embodiments, warps consisting of more threads than processing engines may execute on the processing engines through a regime of time interleaving. For example, a warp consisting of 32 threads may execute on eight processing engines 302 over the course of four instruction cycles. Persons skilled in the art will recognize that core 208 may include a different number of processing engines 302 and registers within the local register file 304 to accommodate data storage for the threads, without departing from the scope of the invention.

Context Migration Across CPU Threads

Figure 4:
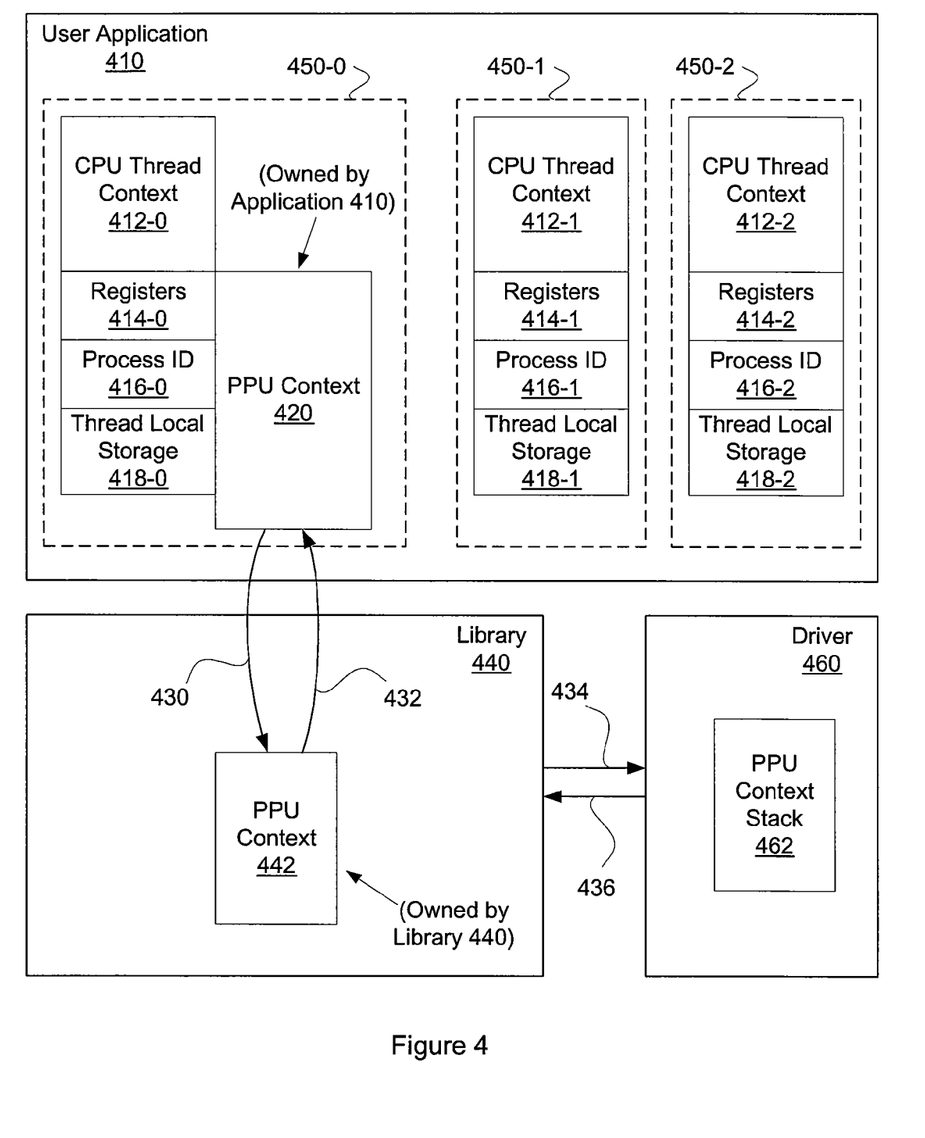
FIG. 4 illustrates a user application calling a library to perform a specific function using a private parallel processing unit context associated with the library, in accordance with one or more aspects of the present invention.

FIG. 4 illustrates a user application 410 calling a library 440 to perform a specific function using a private parallel processing unit context 442 associated with the library, in accordance with one or more aspects of the present invention. The user application 410 may include at least one CPU thread 450. Each CPU thread 450 includes, without limitation, a CPU thread context 412, registers 414, a process ID 416 and thread local storage (TLS) 418. A CPU thread 450 may also include a PPU context, such as PPU context 420 of CPU thread 450-0. The CPU thread context 412 includes information related to the execution of a specific thread. The registers 414 store register values associated with the CPU thread 450. The process identification (ID) 416 stores, without limitation, the process ID of the associated thread. Thread local storage 418 stores data structures defined by the CPU thread 450 and that are local to the CPU thread 450. The PPU context 420 encapsulates resources and actions performed with respect to a given PPU. A PPU driver 460 manages the PPU contexts according to requests transmitted to the PPU driver 460 via a PPU application programming interface (API). An API call 434 to the PPU driver 460 may transfer execution from a calling function to the PPU driver 460. An API function return 436 returns execution to a calling function. The API function return 436 may also return a result code, such as a success or failure flag, to the calling function. An example of an API call 434 from a CPU thread 450 may be a request to the PPU driver 460 to create or initialize a new PPU context.

Each CPU thread 450 within the user application 410 may perform independent tasks for the user application 410, where each task requires a different PPU context. Alternatively, certain CPU threads 450 may perform tasks that require the same PPU context. In both cases, the library 440 may require a yet different PPU context 442 to properly perform tasks assigned by the user application 410. In existing art, PPU context 420 and PPU context 442 must be associated with two independent CPU threads, thereby incurring inefficiencies that diminish the performance of user application 410 when the two. However, with the addition of a PPU context push operation and a PPU context pop operation, one CPU thread may use two or more persistent PPU contexts. Additionally, each PPU context may be used by any arbitrary PPU thread. The PPU context push and PPU context pop operations are invoked via the PPU API.

When the PPU driver 460 receives a PPU context push request, the PPU driver 460 pushes the current PPU context associated with the calling CPU thread onto a PPU context stack 462 and associates a new PPU context with the calling CPU thread. A reference to the new PPU context may be passed to the PPU driver 460 via the PPU context push request. Alternatively, the PPU driver 460 may create the new PPU context if no PPU context is named in the PPU context push request.

Any number of PPU contexts may exist at any one time, where one or more PPU context may not be associated with a PPU thread. Any PPU context that is not associated to a CPU thread is referred to as "floating."

When CPU thread 450-0 of user application 410 calls a library function within library 440, the library 440 should request a PPU context push 430 prior to performing the requested library function. In this scenario, library 440 names PPU context 442 as the new PPU context to be associated with the calling CPU thread 450-0. CPU thread 450-0 may then execute library functions within library 440, while using PPU context 442, which is owned by library 440.

Prior to returning from a function call, library 440 performs a PPU context pop 432, which restores PPU context 420 as the current PPU context of CPU thread 450-0. In this way, CPU thread 450-0 may execute arbitrary functions within library 440, each of which may use an arbitrary PPU context. Importantly, CPU thread 450-0 need not be aware of any PPU context manipulation conducted by library 440. In fact, the function call interface may appear to be identical to any standard function call interface.

Figure 5:
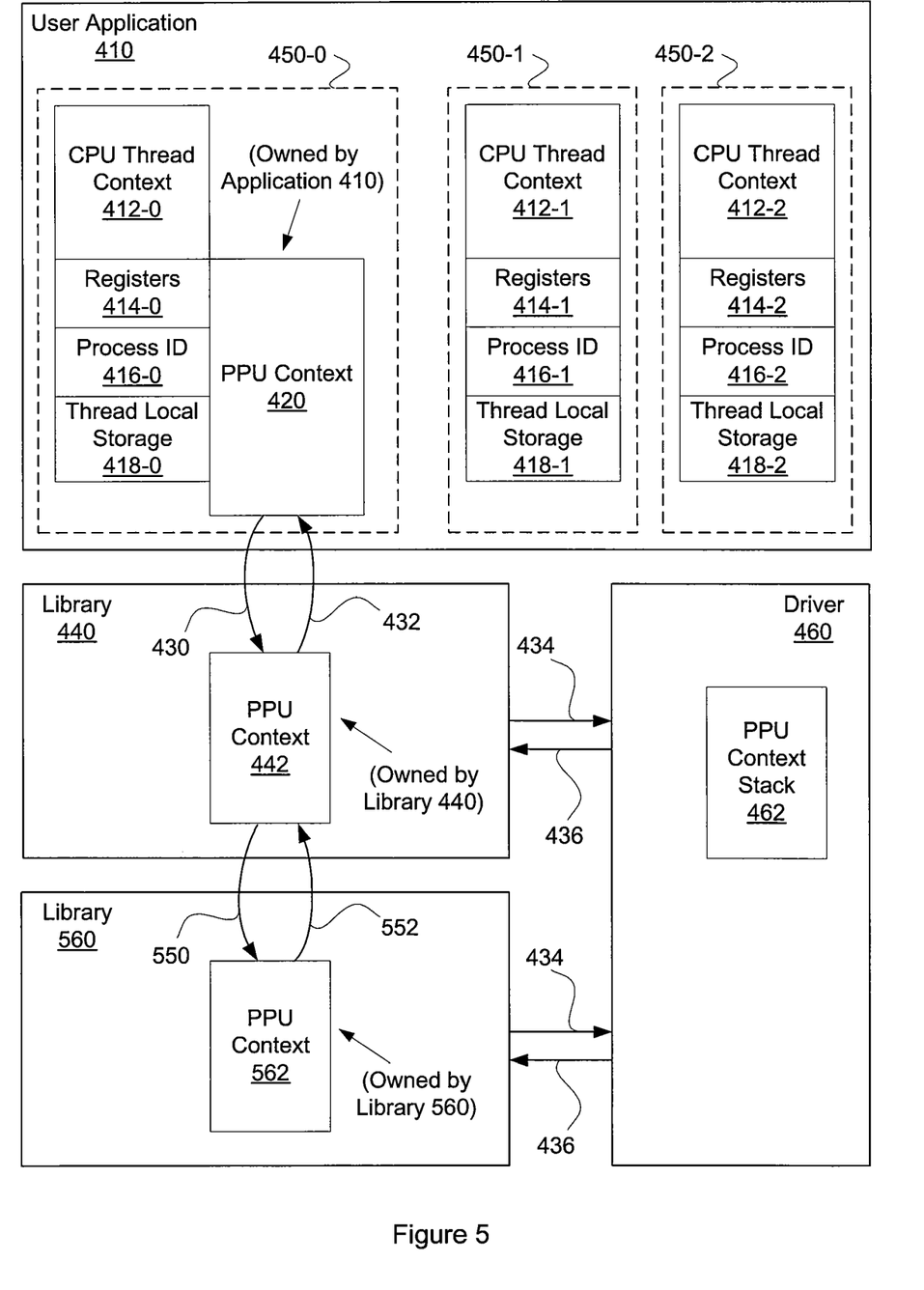
FIG. 5 illustrates a user application with multiple function calling levels, each with an associated private parallel processing unit context, in accordance with one or more aspects of the present invention.

FIG. 5 illustrates a user application 410 with multiple function calling levels, each with an associated private parallel processing unit context 442, 562, in accordance with one or more aspects of the present invention.

In this scenario, the function calling sequence illustrated in FIG. 4 is expanded to include an additional calling level to a second library function within library 560. Library 560 may be distinct from library 440, and may require a separate PPU context. Using the PPU context push and PPU context pop operations discussed in FIG. 4, library 560 is able to execute an arbitrary library function using PPU context 562, which is owned by library 560.

CPU thread 450-0 calls a first function within library 440. The first function performs a PPU context push 430, making PPU context 442 the current PPU context for CPU thread 450-0. The first function calls a second function, within library 560. The second function performs a PPU context push 550, thereby making PPU context 562 the current PPU context for CPU thread 450-0. Prior to returning, the second function performs a PPU context pop 552, restoring PPU context 442 as the current PPU context for CPU thread 450-0. Prior to returning, the first function performs a PPU context pop 432, restoring PPU context 420 as the current PPU context for CPU thread 450-0.

Figure 6A:
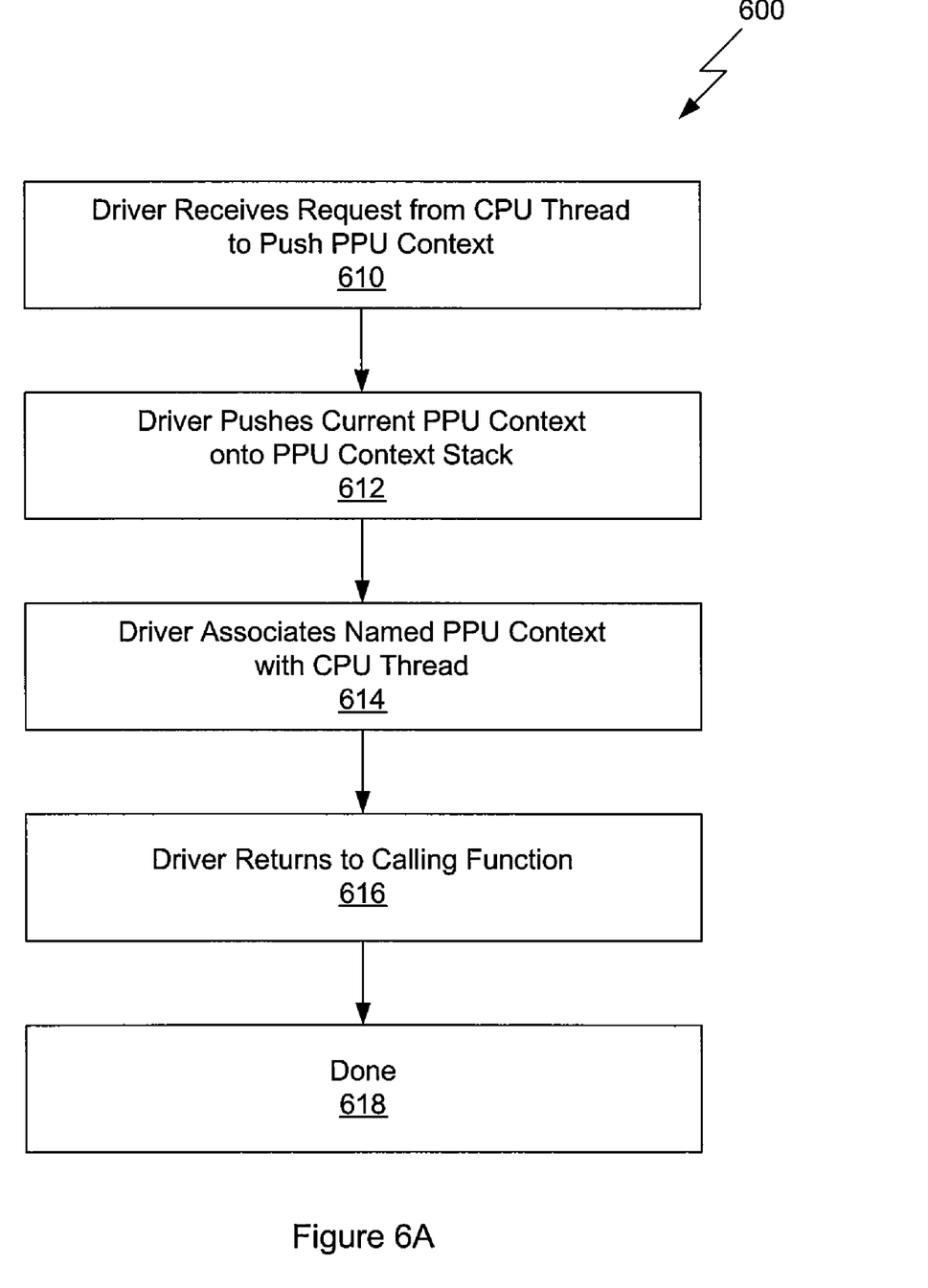
FIG. 6A is a flow diagram of method steps for performing a push operation on a parallel processing unit context, according to one embodiment of the invention.

FIG. 6A is a flow diagram of method steps 600 for performing a push operation on a parallel processing unit context, according to one embodiment of the invention. Although the method steps are described in conjunction with the systems of FIGS. 1-5, persons skilled in the art will understand that any system configured to perform the method steps, in any order, is within the scope of the invention.

The method begins in step 610, where a parallel processing unit (PPU) driver receives a request from a central processing unit (CPU) thread to push a PPU context. In step 612, the PPU driver pushes a current PPU context onto a PPU context stack. In step 614, the PPU driver associates a named PPU context with the CPU thread. In step 616, the PPU driver returns execution to the calling function. At this point, the CPU thread is associated with the named PPU context. The method terminates in step 618.

Figure 6B:
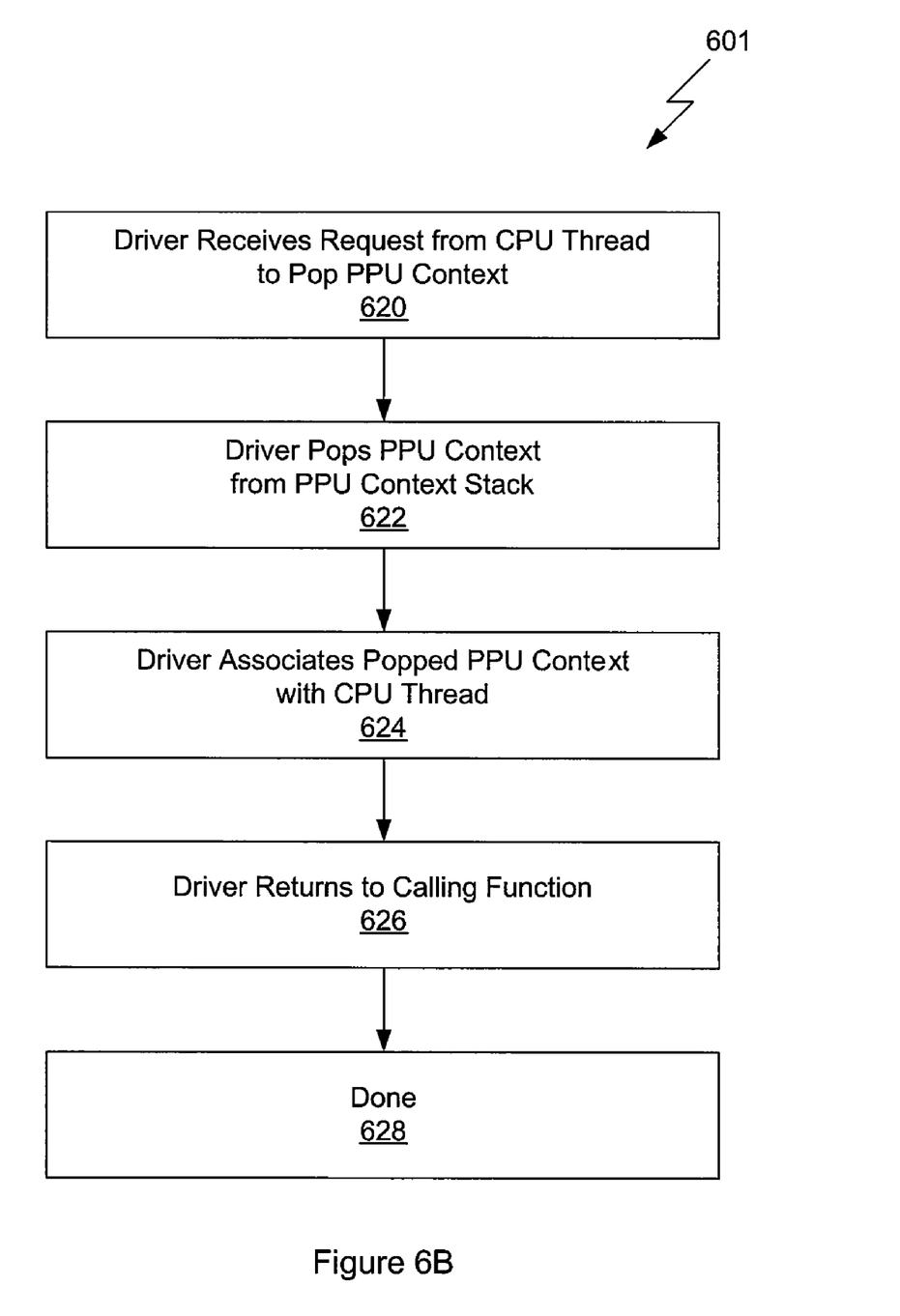
FIG. 6B is a flow diagram of method steps for performing a pop operation on a parallel processing unit context, according to one embodiment of the invention.

FIG. 6B is a flow diagram of method steps 601 for performing a pop operation on a parallel processing unit context, according to one embodiment of the invention. Although the method steps are described in conjunction with the systems of FIGS. 1-5, persons skilled in the art will understand that any system configured to perform the method steps, in any order, is within the scope of the invention.

The method begins in step 620, where the PPU driver receives a request from the central processing unit thread to pop a PPU context. In step 622, the PPU driver pops the PPU context from the top element of the PPU context stack. In step 624, the PPU driver associates a popped PPU context, if any, with the CPU thread. Persons skilled in the art will appreciate that under certain circumstances the PPU context stack may be empty and the PPU driver does not need to associate a popped (null) context with the CPU thread. In step 626, the PPU driver returns execution to the calling function. At this point, the PPU context associated with the calling CPU thread is restored to the previous PPU context from the top of the PPU context stack. The method terminates in step 628.

In sum, a technique for enabling CPU threads to use one or more existing PPU contexts is disclosed. The technique allows a first function with a first PPU context to directly call a second function with a second PPU context, where the first function need not be aware of any PPU context management on the part of the second function. The technique introduces two operators used manage the PPU contexts. The first operator is the PPU context push, which causes the PPU driver to store the current PPU context of a calling thread on a PPU context stack and to associate a named PPU context with the calling thread. The second operator is a PPU context pop, which causes the PPU driver to restore the PPU context of a calling function to the PPU context at the top of the PPU context stack. By performing a PPU context push at the beginning of a function and a PPU context pop prior to returning from the function, the function may execute within a single CPU thread, but advantageously operate on a two distinct PPU contexts.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for preserving a processing unit context associated with a processing unit thread, the method comprising:
    receiving from a first calling function a request to store a first processing unit context associated with the processing unit thread;
    storing the first processing unit context by pushing the first processing unit context onto a stack;
    associating a second processing unit context with the processing unit thread;
    returning execution to the first calling function;
    receiving from a second calling function a request to store the second processing unit associated with the processing unit thread, wherein the first calling function resides within a processing unit thread program, and the second calling function resides within a library;
    storing the second processing unit context;
    associating a third processing unit context with the processing unit thread; and
    returning execution to the second calling function.

2. The method of claim 1, wherein the request comprises an application programming interface function call.

3. The method of claim 1, wherein the processing unit comprises a central processing unit, and the processing unit context comprises a parallel processing unit context.

4. The method of claim 1, wherein the step of storing the second processing unit context comprises pushing the second processing unit context onto the stack on top of the first processing unit context.

5. The method of claim 4, further comprising the steps of:
    receiving a request from the second calling function to restore the second processing unit context to the processing unit thread;
    retrieving the second processing unit context from the top of the stack;
    associating the second processing unit context with the processing unit thread; and returning execution to the second calling function.

6. The method of claim 1, further comprising the steps of:
    receiving a request from the first calling function to restore the first processing unit
    context to the processing unit thread;
    retrieving the first processing unit context;
    associating the first processing unit context with the processing unit thread; and
    returning execution to the first calling function.

7. The method of claim 6, wherein the step of retrieving the first processing unit context comprises popping the first processing unit context from the top of a stack.

8. A non-transitory computer-readable medium including instructions that, when executed by a processing unit, cause the processing unit to preserve a processing unit context associated with a processing unit thread, by performing the steps of:
    receiving from a first calling function a request to store a first processing unit context associated with the processing unit thread;
    storing the first processing unit context by pushing the first processing unit context onto a stack;
    associating a second processing unit context with the processing unit thread;
    returning execution to the first calling function;
    receiving from a second calling function a request to store the second processing unit associated with the processing unit thread, wherein the first calling function resides within a processing unit thread program, and the second calling function resides within a library;
    storing the second processing unit context;
    associating a third processing unit context with the processing unit thread; and
    returning execution to the second calling function.

9. The non-transitory computer-readable medium of claim 8, wherein the request comprises an application programming interface function call.

10. The non-transitory computer-readable medium of claim 8, wherein the processing unit comprises a central processing unit, and the processing unit context comprises a parallel processing unit context.

11. The non-transitory computer-readable medium of claim 8, wherein the step of storing the second processing unit context comprises pushing the second processing unit context onto the stack on top of the first processing unit context.

12. The non-transitory computer-readable medium of claim 11, further comprising the steps of:
    receiving a request from the second calling function to restore the second processing unit context to the processing unit thread;
    retrieving the second processing unit context from the top of the stack;
    associating the second processing unit context with the processing unit thread; and
    returning execution to the second calling function.

13. The non-transitory computer-readable medium of claim 8, further comprising the steps of:
- receiving a request from the first calling function to restore the first processing unit context to the processing unit thread;
- retrieving the first processing unit context;
- associating the first processing unit context with the processing unit thread; and
- returning execution to the first calling function.

14. The non-transitory computer-readable medium of claim 13, wherein the step of retrieving the first processing unit context comprises popping the first processing unit context from the top of a stack.

\* \* \* \* \*